United States Patent [19]

Noguchi et al.

[11] Patent Number: 4,832,469
[45] Date of Patent: May 23, 1989

[54] OPTICAL SYSTEM FOR SEMICONDUCTOR LASER BEAM

[75] Inventors: Masaru Noguchi; Ichirou Miyagawa, both of Kanagawa, Japan

[73] Assignee: Fuji Photo Film Co., Ltd., Kanagawa, Japan

[21] Appl. No.: 32,698

[22] Filed: Apr. 1, 1987

[30] Foreign Application Priority Data

Apr. 1, 1986 [JP] Japan .................. 61-75077
Apr. 10, 1986 [JP] Japan .................. 61-82891
Jun. 26, 1986 [JP] Japan .................. 61-150227
Aug. 21, 1986 [JP] Japan .................. 61-196352

[51] Int. Cl.⁴ .............................................. G02F 1/01
[52] U.S. Cl. .................................. 350/404; 350/402; 372/100; 372/103; 372/106
[58] Field of Search ............... 350/166, 404, 162.11, 350/385, 402, 162.12, 319; 372/100, 102, 103, 106

[56] References Cited

U.S. PATENT DOCUMENTS

| | | | |
|---|---|---|---|
| 3,435,370 | 3/1969 | Harris et al. | 372/100 |
| 3,492,600 | 1/1970 | Zitter | 350/385 |
| 3,504,982 | 4/1970 | Robieux | 372/100 |
| 3,774,121 | 11/1973 | Ashkin et al. | 372/102 |
| 3,866,139 | 2/1975 | Currie | 350/404 |
| 4,009,453 | 2/1977 | Mahlein | 350/166 |
| 4,063,106 | 12/1977 | Ashkin et al. | 372/100 |
| 4,159,453 | 6/1979 | Brandt et al. | 372/100 |
| 4,229,073 | 10/1980 | Lotspeich | 350/404 |
| 4,287,486 | 9/1981 | Javan | 372/101 |
| 4,399,540 | 8/1983 | Bucher | 372/100 |
| 4,500,178 | 2/1985 | Yeh | 350/404 |
| 4,549,300 | 10/1985 | Mitsuhashi et al. | 372/106 |
| 4,573,156 | 2/1986 | Anthony et al. | 350/166 |

OTHER PUBLICATIONS

Kressel et al., *Semiconductor Lasers and Heterojunction LEDS*, Academic Press, New York, 1977, pp. 51, 70–81, and 94–103.

*Primary Examiner*—John K. Corbin
*Assistant Examiner*—Martin Lerner
*Attorney, Agent, or Firm*—Sughrue, Mion, Zinn, Macpeak & Seas

[57] ABSTRACT

An optical system for a semiconductor laser beam comprises a semiconductor laser which generates light comprising both stimulated emission light and spontaneous emissions in accordance with the amount of electric current applied thereto, a convergent lens disposed in the light path of the beam emitted by the semiconductor laser, and an optical element disposed in the light path of the beam from the convergent lens which cuts more spontaneous emission than stimulated emission.

6 Claims, 7 Drawing Sheets

OPTICAL SYSTEM FOR SEMICONDUCTOR LASER BEAM

BACKGROUND OF THE INVENTION

1. Field of the Invention

This invention relates to an optical system for a semiconductor laser beam, particularly to such a system equipped with a semiconductor laser. More particularly, the present invention relates to an optical system for a semiconductor laser beam which enables the laser beam to be converged to a spot of small diameter over a broad output range of the semiconductor laser.

2. Description of the Prior Art

Semiconductor lasers fabricated using semiconductor chips are used for generation of scanning beams in different kinds of equipment such as optical scanners for reading and writing of information. The semiconductor laser has numerous advantages over other types of lasers, including the gas laser. Aside from being more compact and less expensive, it also consumes less power and its output can be modulated by control of the driving current supplied thereto, in what is referred to as direct analogue modulation. The semiconductor laser is especially convenient for use in an optical scanning device for writing information since it allows the aforesaid direct modulation to be conducted using a signal generated in accordance with the image information to be recorded.

In this connection, however, it is known that the light produced by a semiconductor laser includes both stimulated emission and spontaneous emission. The relation between the amounts of these two kinds of light and the amount of current applied to the semiconductor laser will be explained with reference to FIG. 4.

In the graph, the line a represents the relation between the driving current and the spontaneous emission output, while the line b represents that between the driving current and the stimulated emission output. As will be noted, no stimulated emission is produced until the driving current reaches a threshold current value Io, so that up to this current value, only spontaneous emission is generated. While the amount of spontaneous emission output increases gradually with increasing driving current, once the driving current has gone beyond the threshold value Io and the amount of stimulated emission output becomes large, the spontaneous emission comes to account for such a small percentage of the total light output that for all intents and purposes the output can be considered to consist solely of stimulated emission. In the graph, the line c shows the relationship between the amount of driving current and the total light output (i.e. the combined spontaneous emission and stimulated emission output) of the semiconductor laser.

On the other hand, as disclosed for example in U.S. Pat. Nos. 4,258,264, 4,276,473, 4,315,318 and 4,387,428 and Japanese Unexamined Patent Publication No. 56(1981)-11395, the applicant previously proposed a radiation image recording and reproduction system in which recording, read-out and reproduction of radiation images are conducted using a stimulable phosphor sheet as the recording medium. In this system, since the images to be recorded and reproduced have a wide density range, it is necessary in recording the images on the recording medium to modulate the recording beam over a broad dynamic range of 1 : 100-1000. Thus when the light source used for producing the recording beam in the radiation image recording and reproduction system is a semiconductor laser that is directly analogue modulated, it becomes necessary to use the semiconductor laser even in the low output region where the influence from the spontaneous emission produced is large. Differently from the stimulated emission, however, the spontaneous emission includes a mixture of various angular components. Moreover, as in the case of a vertical multimode semiconductor laser, for example, the spontaneous emission consists of spectral components ranging over about 40 nm, in contrast to the spectral range of approximately 2 nm for the stimulated emission. As a result, it is impossible using a convergent lens to converge the spontaneous emission to a spot of such small diameter as is possible in the case of the stimulated emission. Therefore, when the semiconductor laser is used both in the high output region where the stimulated emission dominates and in the low output region where the spontaneous emission dominates, there arises a problem of degraded spatial resolution in the scanning operation.

Further, the semiconductor laser beam source equipped with a semiconductor laser is generally provided with a collimator lens, convergent lens or the like. Thus when, for example, there is used a multimode semiconductor laser which produces spontaneous emission having a spectral range extending over 40 nm, as against a 2 nm range for the stimulated emission component, the spontaneous emission is apt to be effected by the chromatic aberration of these lenses, making it difficult to converge the light to a spot of small diameter without employing expensive lenses that have been precision compensated for chromatic aberration.

SUMMARY OF THE INVENTION

An object of the present invention is to provide an optical system for a semiconductor laser beam produced by a semiconductor laser constituting one element thereof, which optical system reduces the influence of the spontaneous emission produced by the semiconductor laser and expands the output range in which the influence of the stimulated emission produced thereby is large, thereby enabling the light produced in the low output region to be converged to a spot of small diameter.

Another object of the invention is to provide an optical system for a semiconductor laser beam produced by a semiconductor laser constituting one element thereof, which optical system reduces the influence of the spontaneous emission produced by the semiconductor laser, expands the output range in which the influence of the stimulated emission produced thereby is large and the influence of chromatic aberration by lenses of the optical system is avoided, thereby enabling light produced in the low output region to be converged to a spot of small diameter.

A first embodiment of the optical system for a semiconductor laser beam according to the present invention is characterized in that it consists of a semiconductor laser including a semiconductor laser chip, a convergent lens disposed in the light path of the beam emittd by the semiconductor laser and a polarizing filter which passes only light polarized in the direction parallel to the junction plane of the semiconductor laser chip.

It is known that the stimulated emission from which a semiconductor laser is linearly polarized in the direction parallel to the junction plane of the semiconductor laser. In contrast, the light within the spontaneous emission region is randomly polarized. Therefore, when a polarizing filter of the aforesaid characteristics is provided, almost all of the stimulated emission is passed by the polarizing filter while only about one-half of the spontaneous emission generated by the semiconductor laser is passed thereby. Thus, when both stimulated emission and spontaneous emission are incident on the polarizing filter, about one-half of the spontaneous emission will be cut upon passing through the polarizing filter and, as a result, the ratio of the amount of stimulated emission to the total amount of light will increase. Therefore, the dominance of the stimulated emission will extend into a lower region of the light output than heretofore, making it possible to obtain a spot of adequately small diameter even when light in the low output region is used. This is particularly advantageous in a recording optical scanner in which it is necessary to conduct high-precision scanning using a beam that is modulated over a wide dynamic range.

A second embodiment of the optical system for a semiconductor laser beam according to the invention is characterized in that it consists of a semiconductor laser which generates both stimulated emission and spontaneous emission, a convergent lens disposed in the light path of the beam emitted by the semiconductor laser and an interference filter which selectively passes only light of wavelengths within a wavelength region that includes the wavelength region of the stimulated emission and wavelengths in the vicinity thereof.

With this arrangement, the interference filter disposed in the path of the light emitted by the semiconductor laser passes nearly all of the stimulated emission but cuts a major portion of the spontaneous emission. Thus, when both stimulated emission and spontaneous emission are incident on the interference filter, most of the spontaneous emission will be cut upon passing through the interference filter and, as a result, the ratio of the amount of stimulated emission to the total amount of light will increase. Therefore, the dominance of the stimulated emission will extend into a lower region of the light output than heretofore, making it possible to obtain a spot of adequately small diameter even when light in the low output region is used.

Moreover, since the spontaneous emission which passes through the interference filter is almost all of wavelengths within or in the vicinity of the stimulated emission wavelength region, it is almost totally unaffected by the chromatic aberration of the convergence lens, making it possible to obtain a spot of adequately small diameter at the point of convergence using a relatively low-cost lens which has not been specially compensated for chromatic aberration.

Further research carried out by the applicant toward achieving the aforesaid objects led to the discovery that it is possible to converge even the spontaneous emission to a spot of a diameter remarkably smaller than has been possible in the past by providing in the path of the light emitted by the semiconductor laser a light control plate having an aperture located so as to pass only the central portion of the light (the stimulated emission and the spontaneous emission). It was also found that the smaller the aperture of the light control plate is made and consequently the less the amount of light passed, the smaller becomes the diameter of the spot to which the spontaneous emission can be converged. In this connection, however, although the diameter of the spot formed by the converged spontaneous emission can be reduced by reducing the size of the aperture, as such reduction in aperture size also results in a reduction in the amount of light passing through the light control plate, it is necessary to determine the size of the aperture in consideration of the maximum permissible diameter of the spot of converged light and the minimum permissible amount of light.

A third embodiment of the optical system for a semiconductor laser beam according to the invention is characterized in that in addition to a convergent lens disposed in the path of the light emitted from the semiconductor laser there is further disposed in the same light path a light control plate which has an aperture which passes only the central portion of the light, each of the longitudinal and transverse dimensions of the aperture of the light control plate being independently set at a value of 0.2 to 1.5 of the full width of half maximum (FWHM) of the stimulated emission intensity distribution.

It is known that the stimulated emission component of the light emitted by a semiconductor laser spreads out over a certain angular range to form a beam of elliptical cross section. Therefore, using the aforesaid value of the amount of stimulated emission passed as a reference, it is possible to determine the proper size of the aperture of the light control plate. As will be explained in greater detail later, where the size of the aperture is set at 0.2, the transmission rate of the light control plate becomes 20%, and where it is set at 1.5, the diameter of the spot of the converged spontaneous emission relative to the diameter of the spot of the converged stimulated emission taken as 1 becomes 1.6 and the transmission rate becomes nearly 100%. Therefore, in accordance with this embodiment of the invention, it becomes possible to maintain the diameter of the spot of converged spontaneous emission at a relative value of not more than 1.6 with respect to the diameter of the stimulated emission spot while maintaining the amount of the stimulated emission from semiconductor that is utilized at not less than 20%. Provision of the light control plate further has the effect of reducing the beam diameter and thus increasing the depth of focus, and also the effect of eliminating the influence of any slight variance that may be present in the propagation of the stimulated emission, whereby the a stable, constant spot can be obtained. The use of the light control plate is also advantageous from the point that it is inexpensive to fabricate and the point that, because of the relatively wide range of tolerance regarding its positioning, it is easy to install. As a result, the practical value of the embodiment of the invention provided with the light control plate is very high.

A fourth embodiment of the optical system for a semiconductor laser beam according to the invention is characterized in that it consists of a semiconductor laser, a collimator lens disposed in the path of the light emitted by the semiconductor laser, a dispersing optical element provided in the path of the light which has passed through the collimator for changing the path of the light issuing therefrom in accordance with the wavelength of the light incident thereon, a convergent optical element disposed in the path of the light issuing from the dispersing light element, a spatial filter which selectively transmits or reflects only a predetermined wavelength component of the light converged by the convergent optical element, a collimator optical element disposed in the path of the light of predetermined wavelength from the spatial filter for converting the light incident thereon to a parallel light beam, and an reverse-dispersing optical element disposed in the path of the light which has passed through the collimator element for subjecting the light incident thereon to dispersion reverse to that by the dispersing optical element.

As was mentioned earlier, even in the case where the semiconductor laser is a multi-vertical mode laser, the spectral width of the stimulated emission is no more than 2 nm while that of the generated spontaneous emission has a spectrum extending over 40 nm. Thus, in the aforesaid arrangement, by making the path of the light having the same wavelength band as the stimulated emission (namely all of the stimulated emission and a part of the spontaneous emission) different from that of the paths of the other light and by using the spatial filter to separate out the light having the same wavelength band as the stimulated emission, it is possible to eliminate all components of the spontaneous emission differing in wavelength from the stimulated so that, particularly at the beginning of laser light emission, it is possible to shift the ratio between the amount of stimulated emission and the amount of spontaneous emission such that the proportion accounted for by the stimulated emission is increased. As a result, the stimulated emission will dominate down into a lower output region than in the past and, moreover, since only the light components having wavelengths in the wavelength region of the stimulated emission remain, it become possible to obtain a spot of adequately small diameter even when using light in the low output region.

Also, the light extracted by the dispersing optical element and the spatial filter and converged by the convergent optical element is further finely dispersed within its wavelength band by the spatial filter. Therefore, after the extracted light has been passed through the collimator element and converted into a beam of parallel light, it is further reverse-dispersed by the reverse-dispersing optical element to have the dispersion compensated for, whereby there is obtained a single parallel beam.

DESCRIPTION OF THE PREFERRED EMBODIMENTS

Figure 1:
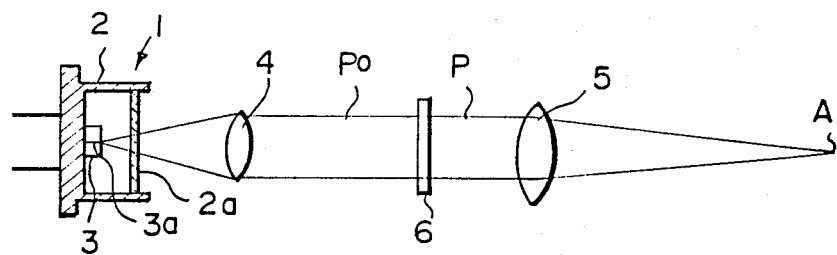
FIG. 1 is a side view of a first embodiment of the optical system for a semiconductor laser beam according to the present invention.

FIG. 1 shows a side view of a first embodiment of the optical system for a semiconductor laser beam according to the present invention.

Figure 2:
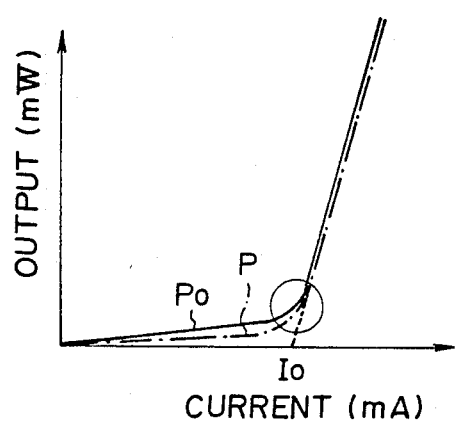
FIG. 2 is a graph showing how the relation between driving current and semiconductor laser output in the case where a polarizing filter is provided compares with the same relation in the case where one is not provided.

The optical system comprises a semiconductor laser 1 consisting of a semiconductor laser chip 3 sealed within an airtight case 2. When an electric current is applied to the semiconductor laser 1 it produces light in an amount proportional to the amount of applied current. The front face of the case 2 is formed as an emission window 2a made of glass or the like and the light emitted through the emission window 2a is converted into a parallel beam by a collimator lens 4 disposed in the light path of the emitted light. This parallel beam advances through a convergent lens 5 to be converged at convergence point A. Between the collimator lens 4 and the convergent lens 5 there is further provided a polarizing filter 6 which passes only light which is polarized in the direction parallel to the junction plane 3a of the semiconductor laser chip 3 (i.e. in the direction perpendicular to the drawing sheet in FIG. 1). As mentioned above, the semiconductor laser 1 generates stimulated emission and spontaneous emission in proportion to the electric current applied thereto and as the light is linearly polarized in the direction parallel to the junction plane 3a nearly 100% thereof is passed by the polarizing filter 6. On the other hand, since the spontaneous emission produced is randomly polarized only about one-half of this light impinging on the polarizing filter 6 is passed thereby. Therefore, the relation between the amount of light Po impinging on the polarizing filter 6 and the amount of light P passed by the polarizing filter 6 can be expressed as Po>P. The relation between the amount of current applied to the semiconductor laser 1 and each of the light amounts Po and P is shown by the graph in FIG. 2.

In the graph, the solid line curve shows how the light amount Po varies with the amount of current applied, while the single dot chain line shows how the light amount P varies therewith. Since as mentioned above the polarizing filter operates to selectively cut a part of the spontaneous emission, in the region where the driving current is below the threshold current Io at which lasing begins, the value of P is about one-half that of Po. Further, during the interval from the time that the current value reaches Io and generation of stimulated emission begins and the time that the amount of stimulated emission reaches a level at which the influence of the spontaneous emission becomes negligible (the interval within the circle in FIG. 2), the ratio of the amount of stimulated emission to the amount of spontaneous emission becomes larger. Therefore when the light which has passed through the polarizing filter is used, the stimulated emission comes to dominate into a lower light output region than in the case where the light is not passed through the polarizing filter. As a result, when the light which has passed through the polarizing filter is used, it becomes possible to adequately converge the light generated in the low light output regions at the convergence point A, and to do so even with respect to the light in low light output regions which could not heretofore be adequately converged to a beam spot at the convergence point A.

The effect of this embodiment of the invention will be be explained with respect to a specific example.

As the semiconductor 1 there was used a Mitsubishi ML4402A semiconductor laser, as the collimator lens 4 there was used one with a wavefront aberration of not more than $\lambda/10$ at wavelengths of 760–810 nm, and as the convergent lens 5 there was used a laser scanning f$\theta$ with a wavefront aberration of not more than $\lambda/8$ at wavelengths of 760–810 nm. As the polarizing filter 6 was used a polarizing beam splitter with a polarization ratio of 1000 : 1. Using the optical system constituted with the foregoing components, the relation between the diameter of the spot of converged light obtained at the scanning position A and the amount of light after passage through the polarizing filter was investigated. The results obtained are represented by the solid line curve in FIG. 3. The broken line in the same figure represents the results obtained when for sake of comparison the polarizing filter was removed from the aforesaid optical system. The lasing threshold of the semiconductor laser used was about 0.2 mW.

Figure 3:
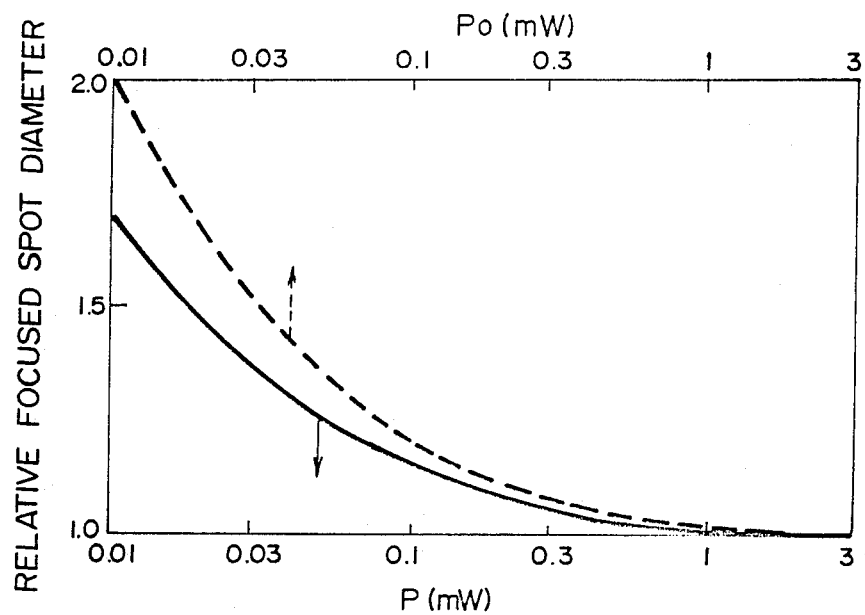
FIG. 3 is a graph showing how the relation between the amount of light and the diameter of the spot of converged light in the case where a polarizing filter is provided compares with the same relation in the case where one is not provided.
Figure 4:
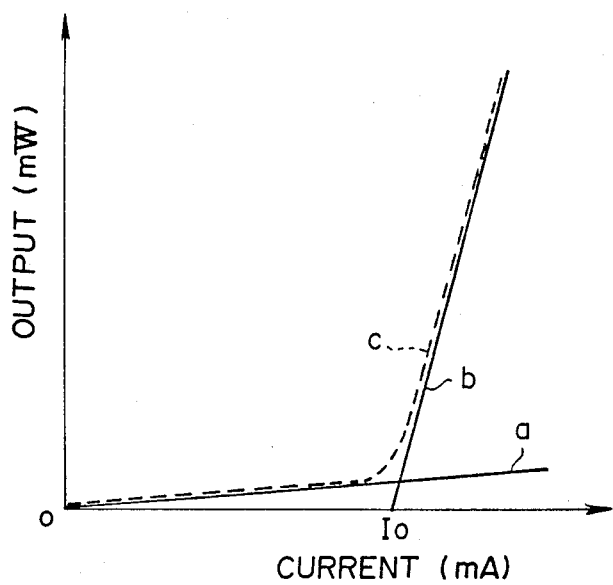
FIG. 4 is a graph showing the relation between the driving current of a semiconductor laser and the spontaneous emission and stimulated emission outputs thereof.

In the graph of FIG. 3, the focused spot diameter is represented as a relative diameter with respect to the spot diameter at an output of 3 mW taken as 1, it being understood that at an output of 3 mW the laser output is adequately large and the spot diameter adequately small regardless of whether the polarizing filter is used or not. It was found that when the polarizing filter was provided, it was possible to reduce the influence of the spontaneous emission and to keep the diameter of the focused spot small in the low output region, as compared with the case where one was not used.

While in the aforesaid embodiment the polarizing filter is disposed between the collimator lens and the convergent lens, it can of course alternatively be disposed between the semiconductor laser and the collimator lens, or behind the convergent lens.

Figure 5:
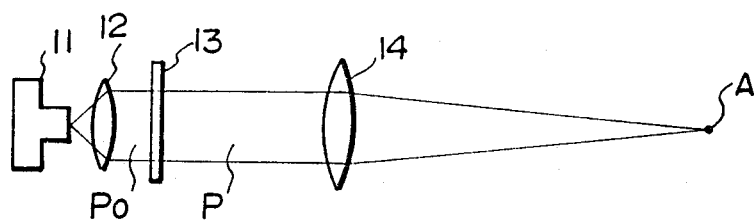
FIG. 5 is a side view of a second embodiment of the optical system for a semiconductor laser beam according to the present invention.

FIG. 5 shows a second embodiment of the optical system for a semiconductor laser beam according to the present invention.

When an electric current is applied to a semiconductor laser 11, it produces light in an amount proportional to the amount of applied current. The light emitted by the semiconductor laser 11 is converted into a parallel beam by a collimator lens 12 disposed in the light path of the emitted light. This parallel beam then enters an interference filter 13 which selectively passes only light of specific wavelengths.

Figure 6:
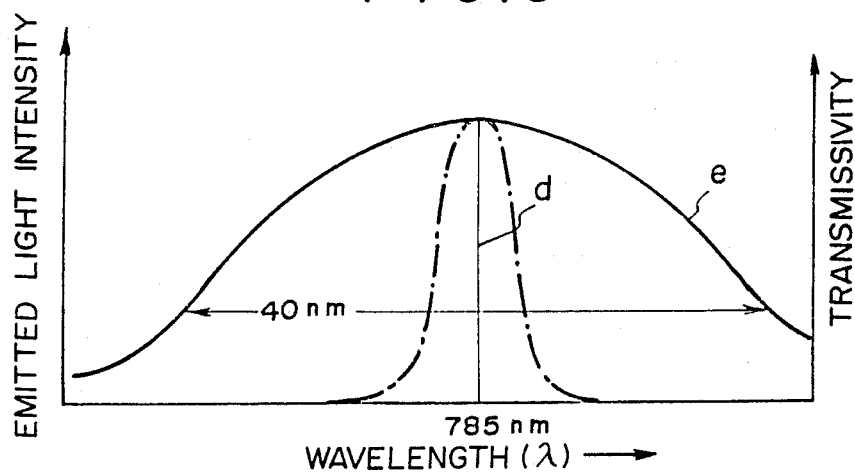
FIG. 6 is a graph showing the spectra of stimulated emission and spontaneous emission as well as the spectral transmission rate characteristics of an interference filter.
Figure 7:
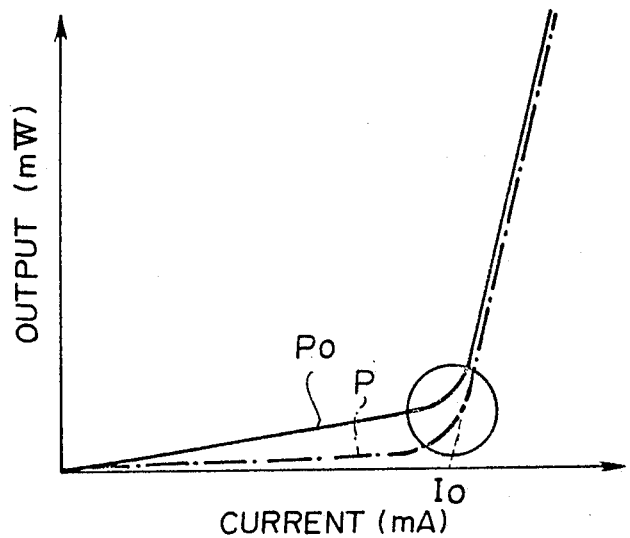
FIG. 7 is a graph showing how the relation between the semiconductor laser driving current and the amount of light after passage through the interference filter compares with the relation between the amount of driving current and the amount of light before passage through the interference filter.

In response to the application of electrical current, the semiconductor stimulated emission 11 generates both laser and spontaneous emission, the spectra of which are shown in FIG. 6. As will be noted from the line d, the spectrum of the stimulated emission extends over a 2 nm range having its center at 785 nm, while as shown by the curve e, the spontaneous emission has a spectrum extending over about 40 nm. The interference filter 13 which receives the stimulated and spontaneous emission with the wavelength characteristics just described has spectral transmission rate characteristics as shown by the single dot chain line in FIG. 6. Specifically, the interference filter selectively passes light of wavelengths within a wavelength region that includes the wavelength region of the stimulated emission and wavelengths in the vicinity thereof. It thus passes nearly 100% of the stimulated emission. On the other hand, of the spontaneous emission, only that part in the wavelength band near the wavelength of the stimulated emission is passed by the interference filter 13 while all other parts are cut thereby. Therefore, the relation between the amount of light Po impinging on the interference filter 13 and the amount of light P passed by the interference filter 13 can be expressed as Po>P. The relation between the amount of current applied to the semiconductor laser 11 and each of the light amounts Po and P is shown by the graph in FIG. 7.

In the graph, the solid line curve shows how the light amount Po varies with the amount of current applied, while the single dot chain line shows how the light amount P varies therewith. Since as mentioned above, the interference filter operates to selectively cut a part of the spontaneous emission, in the region where the driving current is below the threshold current Io at which lasing begins, the value of P is much smaller than that of Po. Further, during the interval from the time that the current value reaches Io and generation of stimulated emission begins and the time that the amount of stimulated emission reaches a level at which the influence of the spontaneous emission becomes negligible (the interval within the circle in FIG. 7), the ratio of the amount of stimulated emission to the amount of spontaneous emission becomes larger. Therefore when the light which has passed through the interference filter is used, the stimulated emission comes to dominate into a lower light output region than in the case where the light is not passed through the interference filter. The light which has passed through the interference filter 13 passes through a convergent lens 14 as shown in FIG. 5 to be converged at a convergence point A. In this embodiment, since the influence of the spontaneous emission is reduced by the interference filter 13, it becomes possible to adequately converge the light generated in low light output regions at the convergence spot A, and to do so even with respect to the light in low light output regions which could not heretofore be adequately converged to a beam spot at the convergence point A.

Lenses such as the collimator lens and the convergent lens used in the aforesaid optical system generally have chromatic aberration. Thus, there is the problem that if light having a broad wavelength band is passed through these lenses, the beam spot formed at the convergence point tends to become large. In the optical system according to the present invention, however, the interference filter 13 serves to extract only light of predetermined wavelengths so that it is possible to avoid any problems arising from the chromatic aberration of the lenses. Therefore, in accordance with this embodiment it is possible to realize a spot of small diameter at the convergence point without need to employ expensive lenses which have been specially compensated for chromatic aberration.

As will be understood from the foregoing, in this second embodiment of the invention a part of the spontaneous emission is cut so as to expand the region in which the influence of the stimulated emission is large and also so as to limit the wavelength band of the utilized light. Using the optical system with these features, the relation between the diameter of the spot of converged light obtained at the scanning position A and the amount of light after passage through the interference filter was investigated. The results obtained are shown by the solid curve in FIG. 8. The single dot line in the same figure represents the results obtained when for sake of comparison the interference filter was removed from the aforesaid optical system.

Figure 8:
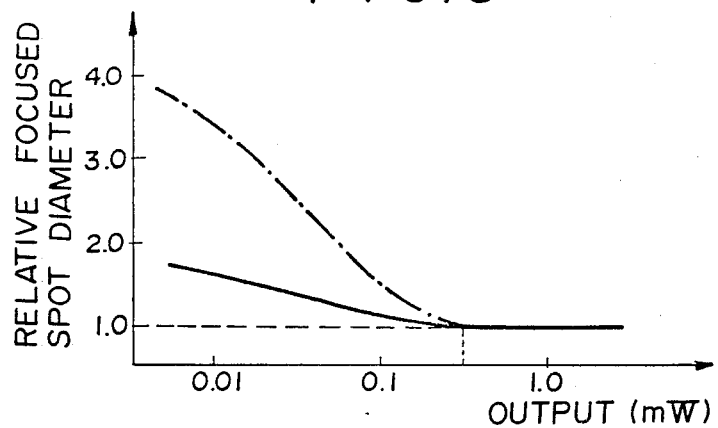
FIG. 8 is a graph showing how the relation between the amount of light and the diameter of the spot of converged light in the case where an interference filter is provided compares with the same relation in the case where one is not provided.

In the graph of FIG. 8, the focused spot diameter is represented as a relative diameter with respect to the spot diameter (defined as a diameter of 1.0) within the region wherein the laser output is adequately large and the spot diameter adequately small regardless of whether the interference filter is used or not. It was found that when the interference filter was provided, it was possible to reduce the influence of the spontaneous emission and to keep the diameter of the focused spot small in the low output region, as compared with the case where one was not used. While the results shown in FIG. 8 were obtained using an interference filter exhibiting a half-width of about 5 nm, the diameter of the spot in the low light output region can be made smaller in proportion as the half-width centered on the wavelength of the stimulated emission is made smaller. Therefore, the half-width of the interference filter should be appropriately selected based on the cost of producing the interference filter, the wavelength band of the light to be used, the range of permissible light spot diameters and the like.

While in the aforesaid embodiment the interference filter is disposed between the collimator lens and the convergent lens, it may of course alternatively be disposed between the semiconductor laser and the collimator lens, or behind the convergent lens.

Figure 9:
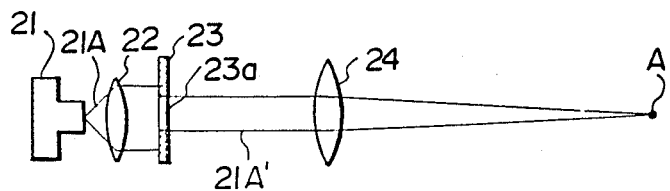
FIG. 9 is a side view of a third embodiment of the optical system for a semiconductor laser beam according to the present invention.

FIG. 9 is a side view of a third embodiment of the optical system for a semiconductor laser beam according to the invention.

When an electric current is applied to a semiconductor laser 21, it produces an amount of light 21A proportional to the amount of applied current. The light 21A emitted by the semiconductor laser 11 is converted into a parallel beam by a collimator lens 22 disposed in the light path of the emitted light. This parallel beam then impinges on a light control plate 23 having a centrally located aperture 23a which passes only the central portion 21A' of the light 21A emitted by the semiconductor 21.

Figure 10:
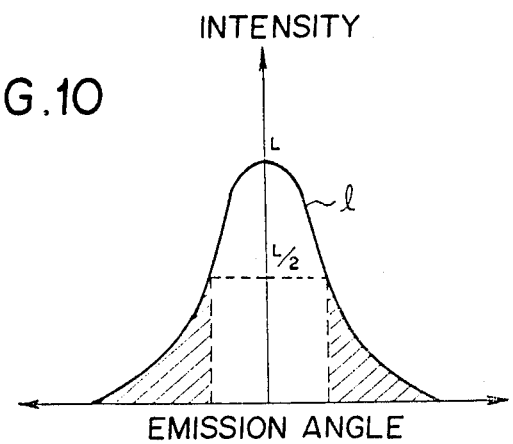
FIG. 10 is a graph showing the angular distribution of stimulated emission intensity.

In response to the application of electrical current, the semiconductor laser generates both stimulated emission and spontaneous emission. As shown in FIG. 10, the stimulated emission exhibits a specific intensity distribution within a prescribed range of emission angles, the intensity being maximum at the center of the angular emission range. The emitted stimulated emission spreads out to different angles in the longitudinal and transverse directions and thus forms a beam having an elliptical cross section. As a result, the curve 1 in FIG. 10 has different slopes in the longitudinal and transverse directions. On the other hand, differently from the stimulated emission, the spontaneous emission includes a variety of different angular components and is emitted in directions in which the stimulated emission is not.

Figure 11A:
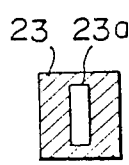
FIG. 11A and 11B are schematic views showing example configurations of the aperture of a light control plate.
Figure 11B:
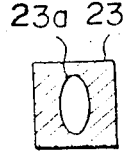

In each of the longitudinal and transverse directions, the magnitude of the aperture 23a of the light control plate 23 which results in passage through the aperture of the stimulated emission which, in the intensity distribution shown in FIG. 10, ranges between the maximum intensity of L and an intensity L/2 equal to one-half the maximum intensity is defined as 1 and the dimensions of the aperture are selected to fall within the range of 0.2 to 1.5 of FWHM. The specific configuration of the sperture 23a can be freely selected, the only condition being that it must permit passage of an amount of the light at the center of the beam falling within the range defined above. The aperture may, for example, have a rectangular shape as shown in FIG. 11A or an elliptical shape as shown in FIG. 11B.

The light which passes through the aforesaid light control plate 23 enters a convergent lens 24 and is converged at a prescribed convergence point A.

Figure 12:
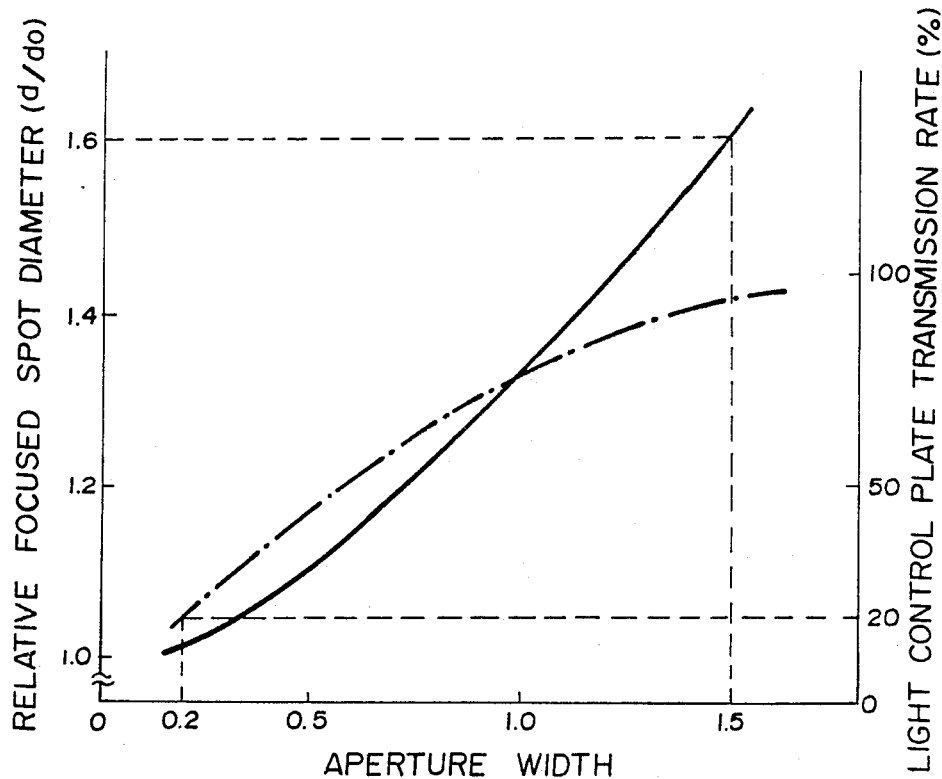
FIG. 12 is a graph showing the relation between the light control plate aperture width and each of the relative spot width and the light control plate transmission rate.
Figure 13:
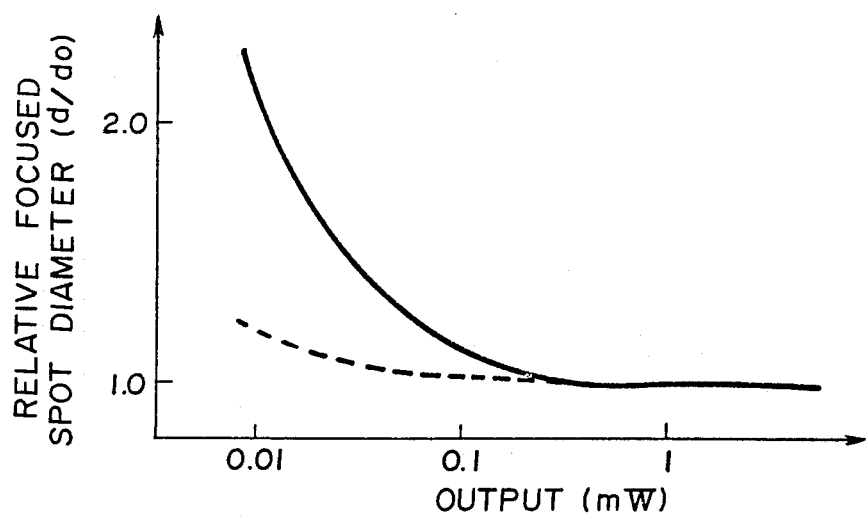
FIG. 13 is a graph showing how the relation between the light output and the light spot in the case where a light control plate is provided compares with the same relation when one is not provided.

When the light control plate 23 is not disposed in the path of the light emitted by the semiconductor laser 21, the relation between the output of the semiconductor laser 21 and the diameter of the focused spot becomes as represented by the solid line curve in FIG. 13. In the graph of FIG. 13, the vertical axis represents the spot diameter relative to the spot diameter at an output of 3 mW taken as 1, the light produced at an output of 3 mW being substantially constituted of stimulated emission. As can be seen from FIG. 13, when the light control plate is not provided, the diameter of the focused spot becomes very large in the low output region where the output consists solely of, or is dominated by, spontaneous emission. In the optical system according to the present embodiment, however, the effect of the light control plate 23 ensures that the diameter of the spot is maintained small in the low output region. In the case where the light control plate 23 is used, if the focused spot diameter at a semiconductor laser output of 3 mW is defined as $d_0$ and the spot diameter at a semiconductor laser output of 0.02 mW (a value at which the spontaneous emission dominates) is defined as d, then the relationship between the size of the aperture 23a of the light control plate 23 and the relative value $d/d_0$ becomes as shown by the solid line curve in FIG. 12. It should be noted that the aperture width shown in FIG. 12 is represented relative to the aforesaid reference magnitude taken as 1. As can be seem from FIG. 12, the smaller the aperture width, the smaller becomes the relative diameter of the focused spot. Where the aperture width is not greater than 1.5, the relative diameter of the focused spot is 1.6 or less, which represents an improvement over the prior art.

Moreover, the percentage of the light passing through the aperture decreases as the aperture becomes smaller. The relation between the size of the aperture and the ratio of the proportion of the total amount of light impinging on the light control plate to the amount thereof passing through the light control plate is represented by the single dot chain line curve in FIG. 12. As is clear from this figure, insofar as the aperture width is 0.2 or larger, the transmission rate of the light control plate is 20% or higher, a range which is permissible depending on the application. It should be noted that the aperture width can be different in the longitudinal and transverse directions and that it can be freely selected within the range of 0.2 to 1.5 in accordance with the low output range to be utilized and the required degree of precision in beam focusing.

By way of example, the longitudinal and transverse dimensions of the aperture 23a of the light control plate 23 were both set at 0.5 and the relation between the semiconductor laser output and the relative diameter of the focused spot as based on the spot diameter at an output of 3 mW was investigated. As can be seen from the results shown by the broken line in FIG. 13, the diameter of the focused spot in the low output region was remarkably smaller than that of the prior art.

While in the embodiment described in the foregoing, the light control plate is disposed between the collimator lens 22 and the convergence lens 24, it can be disposed at any position in the light path between the semiconductor laser 21 and the convergence point A. It is further possible to provide the light control plate 23 internally of the collimator lens 22 or the convergence lens 24. Also, while it is necessary that both the longitudinal and transverse dimensions of the aperture be within the aforesaid range of 0.2 to 1.5, it is obvious that the range of absolute dimensional values of the aperture which satisfy this condition will vary depending on the position at which the light control plate is disposed.

Figure 14:
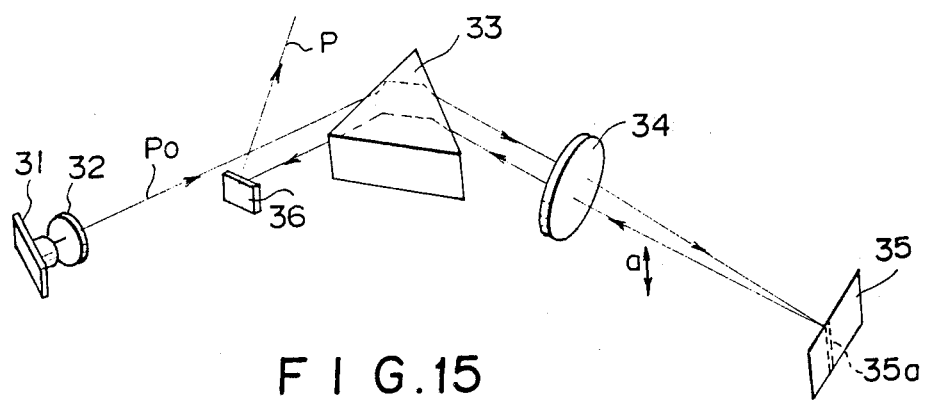
FIG. 14 is schematic perspective view of a fourth embodiment of the optical system for a semiconductor laser beam according to the invention.
Figure 15:
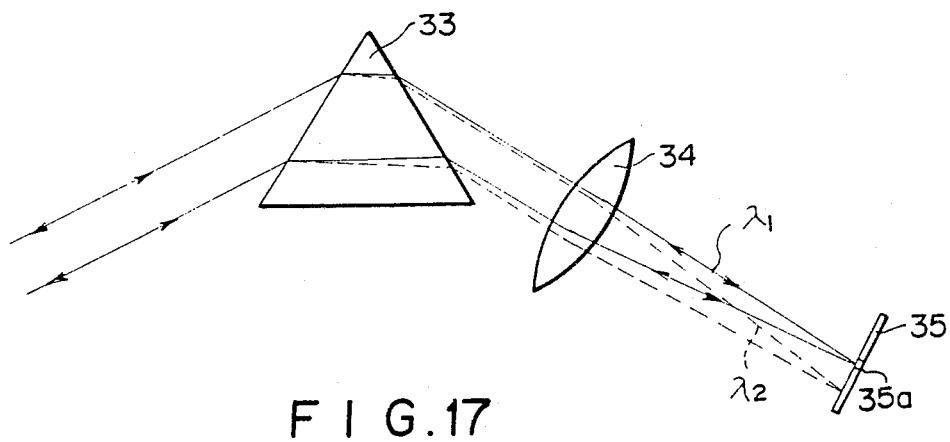
FIG. 15 is a plan view of an important part of the optical system of FIG. 14.

FIG. 14 is a schematic perspective view of a fourth embodiment of the optical system for a semiconductor laser beam according to the invention and FIG. 15 is a plan view of an important part of the same.

When an electric current is applied to a semiconductor laser 31, it produces light in an amount proportional to the amount of applied current. The light emitted by the semiconductor laser 31 is converted into a parallel beam by a collimator lens 32 disposed in the light path of the emitted light. This parallel beam then enters a prism 33 serving as a dispersing optical element which changes the path of the light issuing therefrom in accordance with the wavelength of the light incident thereon. In response to the application of electrical current, the semiconductor laser generates both stimulated emission and spontaneous emission. The spectrum of the stimulated emission extends over 2 nm, while the spontaneous emission has a spectrum extending over about 40 nm. As a result, the stimulated emission passing through the prims 33 substantially follows a single light path while the spontaneous emission passing therethrough follows a number of different light paths in accordance with the wavelength components thereof. More specifically, when the parallel rays of light of various wavelengths enter the prism 33 as shown in FIG. 15, the rays of stimulated emission, which have a wavelength of $\lambda_1$, follow the light path indicated by the solid lines in the figure, while the rays of a light of a wavelength $\lambda_2$ taken as one example of light of a wavelength different from that of the stimulated emission follows the light path indicated by broken lines. The light rays issuing from prism 33 in various directions are converged by a convergent lens 34 disposed in the light path to serve as a convergent optical element. As a result, the rays are converged at different points according to their wavelengths. A slit mirror 35 serving as a spatial filter and capable of selectively extracting only light of wavelengths in the vicinity of $\lambda_1$ is provided at the position where the rays converge. As shown in the figures, the slit mirror 35 has a reflection mirror 35a provided only at the portion corresponding to that at which light with wavelengths in the vicinity of $\lambda_1$ converge, and other portions thereof are arranged either to pass or absorb the incident light. Therefore, owing to the effect of the slit mirror 35 only the components of the light from the semiconductor laser 31 having wavelengths in vicinity of $\zeta_1$, i.e. only the stimulated emission and one portion of the spontaneous emission, are extracted by reflection.

As the light reflected by the slit mirror is finely dispersed within the range of its wavelengths, it is passed back through the convergence lens 34 and the prism 33 to be reverse-dispersed. More specifically, the light reflected from the slit mirror 35 is first returned to the convergent lens 34, which in this case acts as a collimator optical element for converting the light passing therethrough into a parallel beam. Further, the parallel beam exiting from the convergent lens 34 is sent to the prism 33 to be reverse-dispersed by passing through the prism 33 in the opposite direction from the direction it passed through the prism 33 before impinging on the slit mirror 35. As a result, all of the rays entering the prism 33 exit therefrom as a parallel beam following one and the same light path. In other words, in this case the prism 33 acts as an reverse-dispersing optical element which subjects the light to reverse-dispersion. When light of a specific wavelength is reflected by the slit mirror 35, a spatial separation arises between the paths of the impinging and reflected rays. Therefore, the slit mirror 35 is disposed as slightly tilted so that the paths of the impinging and reflected light will be vertically offset from each other (in the direction of the arrow a). The reverse-dispersed light issuing from the prism 33 is, if necessary, deflected by a mirror 36 or the like and then converged as by a convergent lens for use in scanning or the like.

Figure 16:
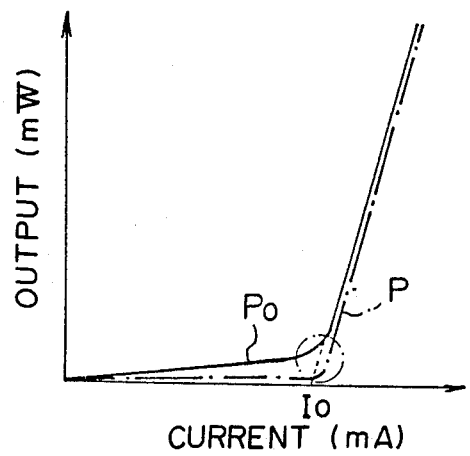
FIG. 16 is a graph showing how the relation between the driving current and the output of the selectively extracted light in the optical system of FIG. 14 compares with the same relation in the conventional optical system.

In the optical system according to this embodiment of the invention, only light having the save wavelength as that of the stimulated emission is selectively extracted and as a result nearly 100% of the stimulated emission is extracted. On the other hand, as the spontaneous emission has a broad wavelength band extending over 40 nm, only one part thereof is extracted. Therefore, the relation between the total amount of light Po emitted by the semiconductor laser 31 and the amount of extracted light P can be expressed as Po>P. The relation between the amount of current applied to the semiconductor laser 11 and each of the light amounts Po and P is shown by the graph in FIG. 16.

In the graph, the solid line curve shows how the light amount Po varies with the amount of current applied, while the single dot chain line shows how the light amount P varies therewith. Since in the optical system of this embodiment the spontaneous emission is selectively cut, in the region where the driving current is below the threshold current Io at which lasing begins, the value of P is much smaller than that of Po. Further, during the interval from the time that the current value reaches Io and generation of stimulated emission begins and the time that the amount of stimulated emission reaches a level at which the influence of the spontaneous emission becomes negligible (the interval within the circle in FIG. 16), the ratio of the amount of stimulated emission to the amount of spontaneous emission becomes larger. Therefore when the optical system according to this embodiment is used, the stimulated emission comes to dominate into a lower light output region and only light having the save wavelength components as the stimulated emission are extracted. As a result, by converging the extracted light, it becomes possible to adequately converge the light generated in low light output regions into a focused beam spot and to do so even with respect to the light in low light output regions which could not heretofore be adequately converged.

Figure 17:
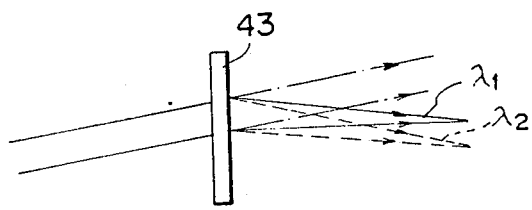
FIG. 17 is a schematic view showing a convergent diffractive grating used in another embodiment of the optical system according to the invention.

While in the aforesaid embodiment, a slit mirror which selectively reflects light of a prescribed wavelength is used as the spatial filter, the spatial filter may alternatively be one that selectively passes light of a prescribed wavelength. While in this case it is not possible to return the selectively extracted light to the convergence lens and the prism, the same effect can be obtained by passing the light transmitted through the spatial filter through a lens or other type collimator element provided in the path of the light exiting from the spatial filter so as to convert the light into a parallel beam and then to pass the parallel beam through a prism or other type reverse-dispersing optical element for subjecting the parallel beam to dispersion reverse from that carried out by the first-mentioned prism. Moreover, instead of the aforesaid prism, it is also possible to use a diffraction grating as the dispersing optical element. If a convergent diffraction grating such as that denoted by the reference numeral 43 in FIG. 17 is used, the light of wavelengths $\lambda_1$, $\lambda_2$ .... extracted as primary rays are simultaneously converged. That is, the diffraction grating can provide both the function of a spatial filter and the function of a convergent optical element such as the aforesaid convergent lens.

We claim:

1. An optical system for a semiconductor laser beam comprising a semiconductor laser including a semiconductor laser chip operative to generate light in a low output region where spontaneous emissions having random polarization dominates and light in a high output region where stimulated emission having a single polarization dominates, a convergent lens disposed in the light path of the beam emitted by the semiconductor laser, and a polarizing filter disposed between said chip and said lens to pass only light traveling from said chip to said lens, said filter operative to pass only light polarized in the direction parallel to the junction plane of the semiconductor laser chip.

2. An optical system for a semiconductor laser beam comprising a semiconductor laser which generates both stimulated emission and spontaneous emission in accordance with the amount of electric current applied thereto, a convergent lens disposed in the light path of the beam emitted by the semiconductor laser, and an interference filter disposed between said laser and said lens to pass only light traveling from said chip to said lens, said filter operative to pass only light to wavelengths within a wavelength region that includes the wavelength region of the stimulated emission and wavelengths in the vicinity thereof.

3. An optical system for a semiconductor laser beam comprising a semiconductor laser which generates both stimulated emission and spontaneous emission in accordance with the amount of electric current applied thereto, a convergent lens disposed in the light path of the beam emitted by the semiconductor laser, and a light control plate disposed between said laser and said lens having an aperture which passes only the central portion of the light emitted by the semiconductor laser and traveling directly from said chip to said lens, each of the longitudinal and transverse magnitudes of the aperture of the light control plate being independently set at a value of 0.2 to 1.5 of the full width of half maximum (FWHM) of the stimulated emission intensity distribution.

4. An optical system for a semiconductor laser beam comprising a semiconductor laser, a collimator lens disposed in the path of the light emitted by the semiconductor laser, a dispersing optical element provided in the path of the light which has passed through the collimator for changing the path of the light issuing therefrom in accordance with the wavelength of the light incident thereon, a convergent optical element disposed in the path of the light issuing from the dispersing light element, a space filter which selectively transmits or reflects only a predetermined wavelength component of the light converged by the convergent optical element, a collimator optical element disposed in the path of the light of predetermined wavelength from the spatial filter for converting the light incident thereon to a parallel light beam, and an undispersing optical element disposed in the path of the light which has passed through the collimator element for subjecting the light incident thereon to dispersion opposite to that by the dispersing optical element.

5. An optical system for semiconductor laser beam as defined in claim 4 wherein the dispersing optical element is a prism and the spatial filter is a slit mirror which selectively reflects light of the predetermined wavelength, the light reflected by the slit mirror being passed through the convergent optical element and the prism, the convergent optical element being used as the collimator element and the prims being used as the undispersing element.

6. An optical system for a semiconductor laser beam as defined in claim 4 wherein the dispersing optical element and the convergent optical element are constituted by a convergent diffraction grating capable of carrying out the functions of both said elements.

* * * * *

UNITED STATES PATENT AND TRADEMARK OFFICE
CERTIFICATE OF CORRECTION

PATENT NO. : 4,832,469

DATED : May 23, 1989

INVENTOR(S) : Masaru Noguchi, et al

It is certified that error appears in the above-identified patent and that said Letters Patent is hereby corrected as shown below:

Claim 2, line 9, change "to" (second occurrence) to --of--.

Signed and Sealed this

Twenty-second Day of May, 1990

Attest:

HARRY F. MANBECK, JR.

*Attesting Officer*   *Commissioner of Patents and Trademarks*